United States Patent [19]

Follain et al.

[11] 3,998,704
[45] Dec. 21, 1976

[54] AUTOMATIC REGULATION SYSTEM FOR A DISTILLATION UNIT

[75] Inventors: Gerard Follain; Eugene Bresson, both of Lyon, France

[73] Assignee: Institut Francais du Petrole, des Carburants et Lubrifiants, France

[22] Filed: Dec. 15, 1971

[21] Appl. No.: 208,165

[30] Foreign Application Priority Data

Dec. 16, 1970 France .......................... 70.45511

[52] U.S. Cl. .............................. 202/160; 202/202; 203/DIG. 18
[51] Int. Cl.² ........................................ B01D 3/42
[58] Field of Search ................. 203/2, DIG. 18; 202/160, 202

[56] References Cited
UNITED STATES PATENTS

| | | | |
|---|---|---|---|
| 2,069,490 | 2/1937 | Fenske | 202/160 |
| 2,915,462 | 12/1959 | Salmon | 203/2 |
| 2,985,565 | 5/1961 | Bellinger | 202/160 |
| 3,228,860 | 1/1966 | Larson | 202/160 |
| 3,309,882 | 3/1967 | Cabanaw | 203/2 |
| 3,441,485 | 4/1969 | Jones | 203/DIG. 18 |
| 3,553,084 | 1/1971 | Creskoff | 203/2 |
| 3,600,283 | 8/1971 | Bollen | 203/2 |

*Primary Examiner*—Hiram H. Bernstein
*Attorney, Agent, or Firm*—Craig & Antonelli

[57] ABSTRACT

Automatic regulation system for a distillation unit including a charging vessel, provided with heating means, surmounted by a distillation column overtopped by a condenser, a withdrawing system and recovery tanks, said system comprising an intermediate tank between the withdrawing system and the recovery tanks, means for controlling the liquid level in said intermediate tank and the discharge of liquid therefrom into the recovery tanks, valve means for applying at will a reduced pressure or the atmospheric pressure to the distillation unit and the intermediate tank and means for changing the recovery tanks in synchronization with the actuation of said valve means.

11 Claims, 2 Drawing Figures

AUTOMATIC REGULATION SYSTEM FOR A DISTILLATION UNIT

This invention concerns an automatic regulation system for a distillation unit which makes it possible to withdraw successive fractions, each in a preset distillation temperature range.

Figure 1:
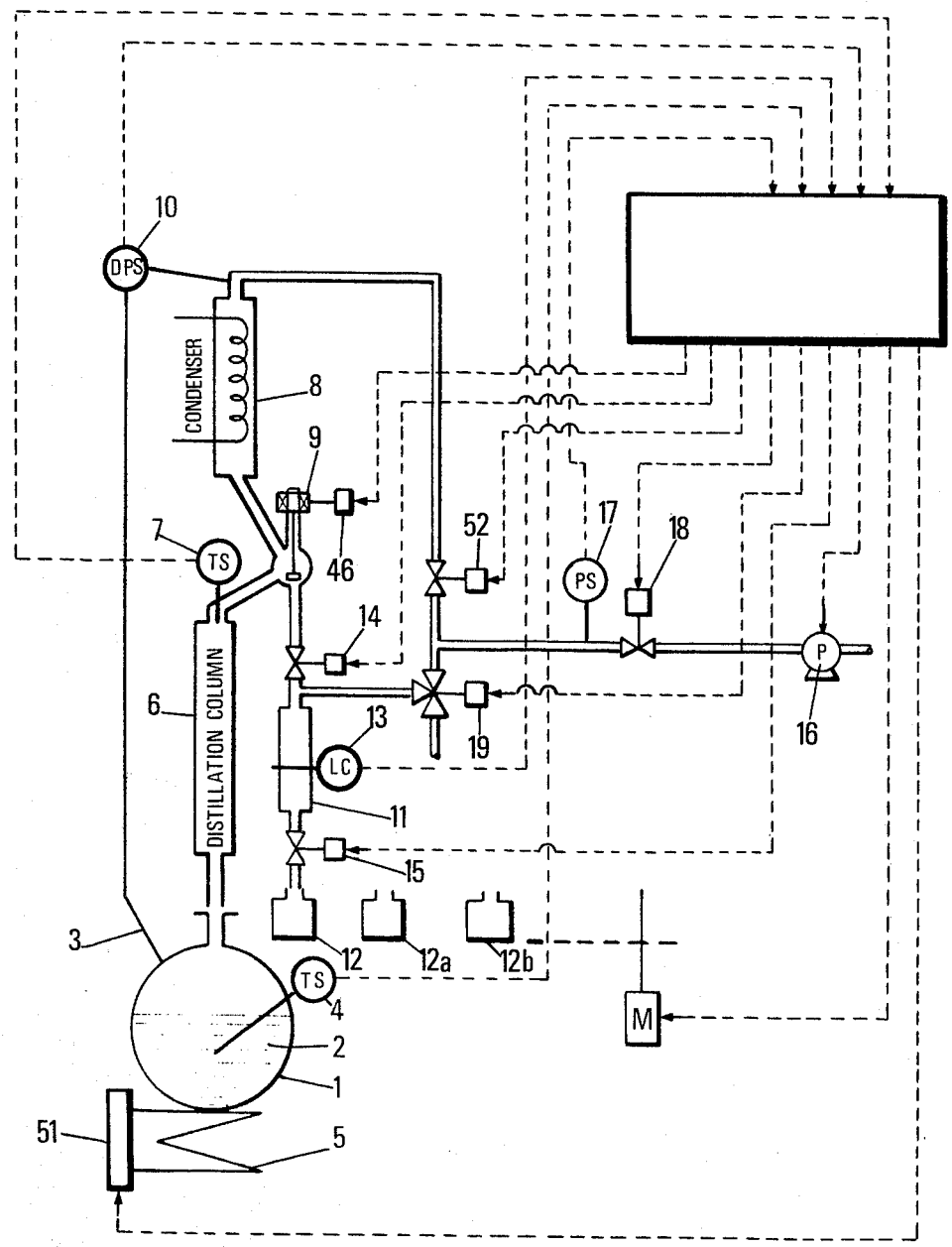
Figure 2:
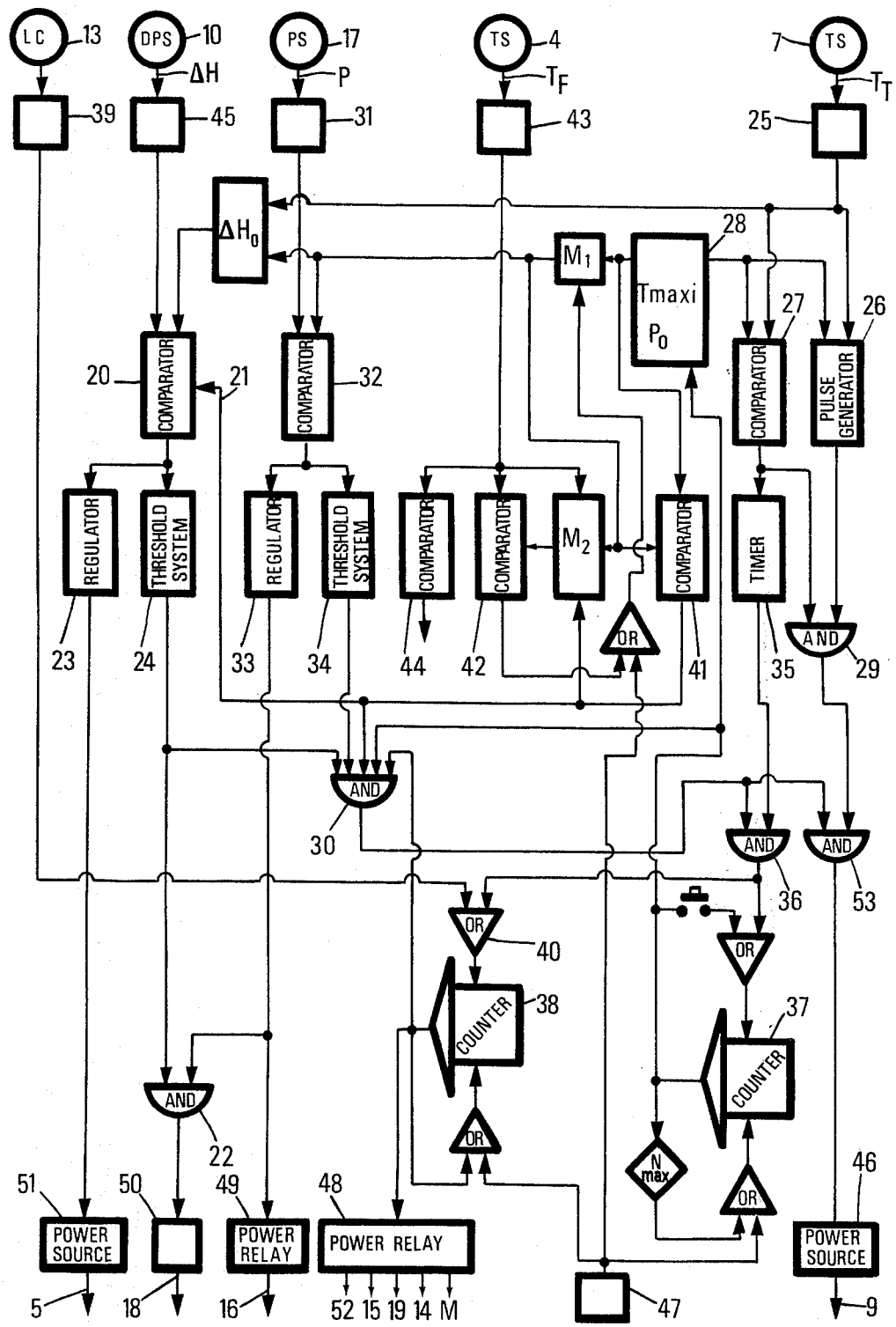

A particular non-limitative embodiment of the invention is hereinafter described with reference to the accompanying drawings wherein:

FIG. 1 diagrammatically shows a distillation unit equipped with an automatic regulation system according to the invention, and FIG. 2 is a diagram of an electric circuit for the automatic regulation according to the invention.

By way of example FIG. 1 shows diagrammatically an illustrative type of apparatus to which can be connected the automatic regulation system of the invention. This apparatus comprises a vessel 1 wherein is placed the product to be distilled, at the beginning of the operation. This vessel is provided with means for pressure transmission 3 and for temperature measurement 4. It is associated to heating means 5. The vessel 1 is surmounted by a distillation column 6 provided with a top temperature sensor 7. This column is overtopped by a condenser associated to an electromechanical withdrawing system 9, this condenser is provided with a top pressure sensor 10. Below the withdrawing system is placed a recovering system comprising an intermediate tank 11 associated to receivers or recovery flasks or tanks 12, 12a, 12b the successive positioning of which, below the intermediate tank is automatically insured by a conveyor actuated by means of a step-by-step motor M. The intermediate tank is provided with level control means 13 and with electrovalve means 14, 15, 52.

This tank is connected to a vacuum pump 16 associated to a pressure regulation system comprising pressure measuring means 17, an electrovalve 18 for connection with the vacuum pump and a three-ways electrovalve 19 for controlling the creation of a vacuum or the admission of air under atmospheric pressure in the intermediate tank 11.

It is an object of the regulation system according to the invention, to separate, as quickly as possible, the fraction of the charge contained in the vessel, whose boiling range is between two preset temperature values. When several fractions have to be obtained, each one must be recovered in one or more recovery flasks or tanks separate from those containing the other fractions.

In order to achieve this result, it is necessary to insure a convenient heating of vessel 1, i.e. which insures a sufficient but not excessive filling of the column 6, to select the reflux rate compatible with the required fractionation quality, to provide a well determined constant pressure to the assembly 1-6-8 and 11, to insure the renewal of the recovery flasks or tanks and to control the change of the distillation conditions when passing to the distillation of the next fraction, optionally including a pressure change.

It is noticeable that the apparatus must be considered as a whole which is necessary for achieving a complete automation.

However, for sake of clarity the automatic regulation device according to the invention will be described in its different parts each corresponding to a separate actuation of the regulation or control and with a showing of the main connections.

This description will be made with reference to FIG. 2 showing a non-limitative embodiment of a lay out diagram of an automatic regulation electric circuit according to the invention.

The parameters to be controlled are respectively:
the heating power,
the reflux and the withdrawal rates,
the operating pressure Moreover it is necessary to control the various devices which have to take part in the carrying out of the change of fraction.

We will now examine the means and the parameters used for performing these various controls.

1-Control of the heating power

The heating power is controlled by means of the pressure difference $\Delta H$ measured between the vessel 1 (bottom of the column) and the condenser 8 (top of the column).

The measurement is carried out by means of a differential pressure sensor and converted to a signal by measuring system 45. This signal is then transmitted to a comparator 20. This comparator may receive an inhibition signal 21 forbidding the heating and receives a reference signal $\Delta H_o$ which, in combination with the measuring signal, produces, when the heating authorization is given, a difference signal. This difference signal actuates a regulator having a proportional, integral and differentiating action, which itself controls a power source 51, actuating the vessel heating device 5.

The reference signal is permanently elaborated from the values of such parameters as the operating pressure, the instantaneous top temperature and a certain number of constants and coefficients, said coefficients being determined by a set of preliminary measurements on the column.

A threshold system 24 receives the difference signal issued from the comparator 20 and delivers a withdrawing authorization at the AND gate 30, provided that the measured difference be lower in absolute value than a given threshold value and that, when exceeding said value, the difference have been again nullified.

2-Control of the reflux rate

The control of the reflux rate is performed by modulation of the closure time of the withdrawing system. The modulation of the closure is a function of the difference between the top temperature $T_T$ and the maximum fractionation temperature $T_{max}$; this modulation is achieved in a progressive manner between a minimum value when said difference is greater or equal to a preselected value and a maximum value when said difference is substantially equal to zero. When the difference is zero the withdrawing system is kept permanently closed. In order that the withdrawal be made possible, a certain member of conditions must be fulfilled.

The measurement of the top temperature $T_T$ is performed, for example, by means of a pyrometric sonde and converted to a signal in the measuring system 25. This signal feeds both the pulse generator 26 and the comparator 27; these two members further receiving the information relating to the maximum fractionation temperature $T_{max}$ displayed at 28.

The generator 26 delivers pulses for the opening of valve 9, of a steady duration, at time intervals which are a function of the difference between the top temperature and the maximum fractionation temperature ($T_T - T_{max}$). When the comparator 27 shows that the difference between $T_T$ and $T_{Max}$ is zero, the AND gate 29 no longer transmits pulses for the opening of the valve 9.

These opening pulses are transmitted, through a logic gate 53 of the AND type, to a power source 46 which controls the withdrawing: by this way the transmission of this signal occurs only when a certain number of conditions are simultaneously fulfilled at the logic AND gate 30. These conditions are presently: the selection of the distillation pressure made at 41, the indication of the establishment of the pressure within a certain range about the selected value, this indication coming from 34, the indication of the observed equilibrium of the column coming from 24, the indication of the condition that no change of the recovery tank is carried out at this moment, which is given from 38 and the indication that the order of starting the distillation has been given, coming from 37.

3-Control of the operating pressure

In order to avoid any deterioration by excessive heating, of the product subjected to distillation, when the bottom temperature of the vessel is too high, the next fractions are distilled at lower static pressures so as to decrease the boiling temperature. It is then necessary to know with accuracy the operating pressure in order to select accordingly the equivalent fractionation temperature. It is not strictly necessary that the operating pressure be chosen in a continuous manner; it is sufficient to get a series of discrete values, e.g. 4 values within the range of from 760 mmHg to 1 mmHg, for solving all these problems. Accordingly the vacuum regulator will have three operating preset values.

The measurement of vacuum P is made by a sensor 17 placed at the inlet of the enclosure and is converted to a signal by the measuring device 31. This signal is conveyed to a comparator 32 which also receives the reference signal corresponding to the pressure to be regulated for the considered fraction (pression $P_o$ displayed at 28). The difference signal acts on a regulator 33 which controls both the operation of the vacuum pump 16, through the intermediary of the power relay 49, as soon as it is desired to operate under reduced pressure, and the opening of the electrovalve 18, by means of the logic gate 22 and the power source 50, for maintaining the vacuum at the desired value. The logic gate 22 further receives a signal, from the threshold circuit 24, which forbids the opening of the electrovalve 18 when the column is fouled up. The difference signal is also used for controlling a threshold system 34 which authorizes the withdrawing when the measured difference is lower in absolute value than a given threshold value, and, if it exceeds said value, when the difference has been again nullified.

4-Change of fraction

When a fraction has been completely distilled off, the recovery tank must be separated and the fraction must be withdrawn in a specific flask, the distillation conditions of the next fraction must be established (static pressure and column equilibrium) and the withdrawing has again to be performed up to the maximum boiling temperature set for the next fraction.

It is considered that the distillation of a fraction is complete when the top temperature $T_T$ is maintained during a given time at the value of the maximum fractionation temperature $T_{max}$.

This is detected by the comparator 27 which transmits a signal to the timer 35, which, in turn, delivers, after a determined time interval, a so-called fraction end pulse. Provided that the column be in correct equilibrium, that the operating pressure be as desired and that the last to distill fraction be not reached, this pulse is conveyed through the AND gate 36 to a counter 37 which progresses by one step. This fraction end pulse is also transmitted to the recovery tank changing system (counter 38). Through the intermediary of the power relay 48, the system disconnects the intermediate vessel 11 by closing the valve 14 and restores the atmospheric pressure thereinto through valve 19, places in position a new recovery vessel, insures the transfer of the liquid from the intermediate vessel 11 to the recovery tank 12, disconnects the distillation zone from the vacuum regulator by closing the electrovalve 52, restores the connection between the intermediate tank and the vacuum regulator for obtaining the desired pressure thereinto and restores the communication with the distillation system. A level control 13 is added to the system in order to prevent any overflow of the recovery tanks (39 and OR gate 40).

This fraction end pulse is transmitted to counter 37 which changes the order values of maximum fractionation temperature and, if necessary, of the distillation pressure. Consequently two different operations are possible, depending on the fact that the pressure is changed or not when passing from the distillation of one fraction to that of the next one.

This fact is detected by the comparator 41; the operating pressure for the fraction whose distillation is complete appears at the output of memory $M_1$, the operating pressure of the new fraction to be distilled is forwarded by the order system 28 to the input of said memory $M_1$. The comparator 41 detects the occurrence of the equality between the operating pressure for the preceding fraction and the pressure for the new fraction to be separated and delivers a logic signal authorizing again the withdrawing when there is no change in the operating pressure, and actuating the system for changing the reduced pressure in the other case.

When there is a change in the operating pressure, a control signal is delivered at the output of the comparator 41; this signal stops the heating by acting on the comparator 20 and memorizes in $M_2$ the result of the computation of the equivalent temperature. By equivalent temperature it is meant the boiling temperature of the products not yet distilled at the new pressure displayed at 28.

This signal is transmitted to a comparator 42 which also receives a signal proportional to the temperature $T_F$ in the flask bottom, measured at 4 and converted to a signal in 43. When said temperature reaches the value of the equivalent temperature memorized in $M_2$, the comparator 42 issues a transfer signal which memorizes in $M_1$ the new pressure value to be obtained and maintained in the distillation system; the vacuum regulator is controlled by the output signals from this memory; it will thus and only at this moment adjust the pressure to said new value; the heating will be restored only when the convenient pressure will be reached and the withdrawing only when the column will be again in equilibrium.

An annex circuit stops the distillation when the last fraction displayed with serial member Nmax, has been withdrawn.

Another annex circuit automatically stops the distillation when the temperature at the bottom of the column exceeds a certain limit value considered as too high for the product to be distilled. This is achieved by means of comparator 44.

The circuit 47 automatically resets to zero all the circuits, irrespective of their condition at the moment of the voltage supply to the apparatus, so that the sequential operations (change of operating pressure with the use of memories $M_1$ and $M_2$, counting of the fractions by means of counter 37, and system for changing the recovery tanks by means of 38) may proceed normally from an initial known state.

What we claim is:

1. An automatic regulation system for a distillation unit including: a vessel for containing the product to be distilled, heating means for heating said vessel, a distillation column in communication with and surmounting said vessel, recovery tanks, means for changing the recovery tanks, a condenser having a lower part communicating with an upper part of said distillation column, an intermediate tank provided with inlet and outlet valves, a controlled withdrawing system interposed between said recovery tanks and said condenser, said intermediate tank communicating with said recovery tanks, said intermediate tank further communicating with the lower part of said condenser through said controlled withdrawing system, pressure reducing means communicating with the assembly formed by the vessel, the distillation column, the condenser and the intermediate tank through valve means for applying a given vacuum or the atmospheric pressure to said assembly, level control means for controlling the liquid level in said intermediate tank, first pressure measuring means in said vessel, second pressure measuring means at the top of said condenser, first temperature measuring means in said vessel, second temperature measuring means at the top of said column, controlling means for simultaneously controlling the reflux rate, heating rate, change of fraction and operating pressure of the distillation unit, said controlling means being responsive to said level control means, to said first and second pressure measuring means and to said first and second temperature measuring means for actuating and controlling said controlled withdrawing system, said heating means, said inlet and outlet valves and said pressure reducing means in synchronization with said means for changing the recovery tanks.

2. An automatic regulation system according to claim 1, wherein said controlling means includes generating means delivering a signal representing the difference between the measuring values obtained from said first and second pressure measuring means, said controlling means energizing said heating means as a function of said signal.

3. An automatic regulation system according to claim 1, wherein said controlling means includes difference means providing a signal which is a function of the difference between the temperature at the top of the column and the displayed maximum fractionation temperature, and means for controlling the time of closure of the withdrawing system in accordance with the difference signal for regulating the reflux rate.

4. An automatic regulation system according to claim 3, wherein said difference means provides said difference in the form of electric pulses of steady duration transmitted at time intervals which are function of said difference.

5. An automatic regulation system according to claim 3, including means for controlling said withdrawing system which is simultaneously responsive for actuation to the nullification of the difference signal, to the establishment of the pressure at its displayed value, to the column equilibrium which is detected by a threshold system controlled by the difference between the top pressure and the bottom pressure, to the nonoperation of the means for changing the recovery tanks, and to the absence of an order for starting the distillation operation.

6. An automatic regulation system according to claim 5, wherein said means for reducing the pressure are constituted by a vacuum pump, comprising means for measuring the pressure in said distillation unit, means for generating a signal representing the difference between said pressure and a preset pressure value, actuating means responsive to said pressure difference signal for controlling said vacuum pump and said valve means whereby the distillation unit communicates with said vacuum pump.

7. An automatic regulation system according to claim 6, wherein said means for changing the recovery tanks is associated with the valves for establishing the communication between the recovery tanks and said intermediate tank and between said intermediate tank and said withdrawing system and associated with a switching means, whereby pressure in said intermediate tank is set at the value of the atmospheric pressure or at a reduced pressure, said means for changing the recovery tanks being actuated after a predetermined delay, by signals respectively depending on the maintenance during a given time of the temperature at the top of the column at a preset value corresponding to the maximum fractionation temperature or on the liquid level in said intermediate tank.

8. An automatic regulation system for a distillation unit including:

a vessel for containing the product to be distilled, heating means for heating said vessel, a distillation column in communication with and surmounting said vessel, recovery tanks, a condenser having a lower part communicating with an upper part of said distillation column and with said recovery tanks, an intermediate tank provided with inlet and outlet valves, a controlled withdrawing system interposed between said recovery tanks and said condenser, said intermediate tank communicating with said recovery tanks and through said controlled withdrawing system with the lower part of said condenser, pressure reducing means communicating with the assembly formed by the vessel, the distillation column, the condenser and the intermediate tank through valve means for applying a given vacuum or the atmospheric pressure to said assembly, level control means for controlling the liquid level in said intermediate tank, first pressure measuring means in said vessel, second pressure measuring means at the top of said condenser,
first temperature measuring means in said vessel,
second temperature measuring means at the top of said column,
controlling means for simultaneously controlling the reflux rate, heating rate, change of fraction and operating pressure of the distillation unit, said controlling means being responsive to said level control means, to said first and second pressure measuring means and to said first and second temperature measuring means for actuating said controlled withdrawing system, said heating means, said inlet and outlet valves and said pressure reducing means in synchronization with means for changing the recovery tanks, said controlling means including generating means delivering a first signal representing the difference between the measuring values obtained from said first and second pressure measuring means, said controlling means energizing said heating means as a function of said first signal, difference means providing a second signal which is a function of the difference between the temperature at the top of the column and the displayed maximum fractionation temperature, and means for controlling the time of closure of the controlled withdrawing system in accordance with said second signal for regulating the reflux rate,
means for controlling said controlled withdrawing system which is simultaneously responsive for actuation to the nullification of the difference signal, to the establishment of the pressure at its displayed value, to the column equilibrium which is detected by a threshold system controlled by said first signal, to the nonoperation of the means for changing the recovery tank, and to the absence of an order for starting the distillation operation,
said pressure reducing means being constituted by a vacuum pump, means for measuring the operating pressure in said distillation unit, means for generating a third signal representing the difference between said operating pressure and a preset pressure value,
actuating means responsive to said third signal for controlling said vacuum pump and said valve means, the distillation unit communicating with said vacuum pump, said means for changing the recovery tanks being on one hand associated with the valves for establishing the communication between said recovery tanks and said intermediate tank and between said intermediate tank and said controlled withdrawing system and on an other hand associated with a switching means, the pressure in said intermediate tank being set at the value of the atmospheric pressure or at a reduced pressure, said means for changing the recovery tanks being actuated after a predetermined delay, by signals respectively depending on the maintenance during a given time of the temperature at the top of the column at a preset value corresponding to the maximum fractionation temperature or on the liquid level in said intermediate tank,
means for comparing the operating pressure for the completely distilled fraction to the pressure displayed for the new fraction to be separated, said comparing means producing a fourth signal for controlling the withdrawing when the compared pressures are equal and for controlling the means for changing the value of the reduced pressure to a new pressure value when the compared pressures are unequal, and
means for the intermediate memorization of the value, determined by computation, of the boiling temperature, under the new pressure, of the still undistilled product, of a comparison to be made between the products not yet distilled, of a comparison between said last-mentioned temperature and the temperature at the bottom of the vessel containing the product to be distilled and, at the moment when these two temperatures are equal, of the display of the new pressure value.

9. An automatic regulation system according to claim 8, by regulation of the heating power of said heating means, of the operating pressure, of the reflux rate and of the conditions for changing the recovery tanks, making use, as control parameters of the regulations, of the temperature at the bottom of the vessel containing the product to be distilled, the temperature at the top of the distillation column, the static operating pressure, the difference between the respective pressures at the top and the bottom of the column and the liquid level in said intermediate tank.

10. An automatic regulation system according to claim 9, further comprising means for stopping the distillation as soon as the last fraction, defined by its displayed distillation range, has been withdrawn.

11. An automatic regulation system according to claim 10, further comprising means for automatically stopping the distillation when the bottom temperature exceeds a preset critical value.

* * * * *